United States Patent [19]
Davidian

[11] Patent Number: 5,857,484
[45] Date of Patent: Jan. 12, 1999

[54] LIQUID SUPPLY DEVICE AND VALVE STRUCTURE

[75] Inventor: Steven L. Davidian, P.O. Box 833, Chagrin Falls, Ohio 44022

[73] Assignee: Steven L. Davidian, Chagrin Falls, Ohio

[21] Appl. No.: 651,700

[22] Filed: May 21, 1996

[51] Int. Cl.⁶ .................................................. E03B 11/02
[52] U.S. Cl. .............................................. 137/454; 251/7
[58] Field of Search ..................... 137/454, 572; 251/7

[56] References Cited

U.S. PATENT DOCUMENTS

| | | | |
|---|---|---|---|
| 2,729,971 | 1/1956 | Stein | 251/7 X |
| 3,656,507 | 4/1972 | Martinez | 137/454 |
| 3,697,026 | 10/1972 | Hambrick . | |
| 4,121,608 | 10/1978 | MacLeod . | |
| 4,172,580 | 10/1979 | Raftis et al. . | |
| 4,886,087 | 12/1989 | Kitchen | 137/614.04 X |
| 4,892,229 | 1/1990 | Rudick | 251/7 X |
| 4,930,252 | 6/1990 | Krause et al. . | |
| 4,993,176 | 2/1991 | Spinosa . | |
| 5,009,028 | 4/1991 | Lorenzana et al. . | |
| 5,076,009 | 12/1991 | Cibor . | |
| 5,111,611 | 5/1992 | Elder . | |
| 5,157,868 | 10/1992 | Munoz . | |
| 5,299,381 | 4/1994 | Oldenburg, Jr. . | |
| 5,349,997 | 9/1994 | Rial . | |
| 5,369,910 | 12/1994 | Copenhaver . | |

*Primary Examiner*—John Fox
*Attorney, Agent, or Firm*—Jones, Day, Reavis & Pogue

[57] ABSTRACT

A liquid supply device is disclosed which includes a reservoir and a supply tube for providing liquid to a basin. A shut-off valve includes a support structure for retaining the supply tube to the basin. The shut-off is attached to the supply tube and engages the support structure so as to automatically discontinue liquid flow in the event that the supply tube becomes disengaged from the support structure. Several types of shut-off valves are disclosed for use with the present invention including a pinch valve, a ball valve and a duckbill valve.

15 Claims, 6 Drawing Sheets

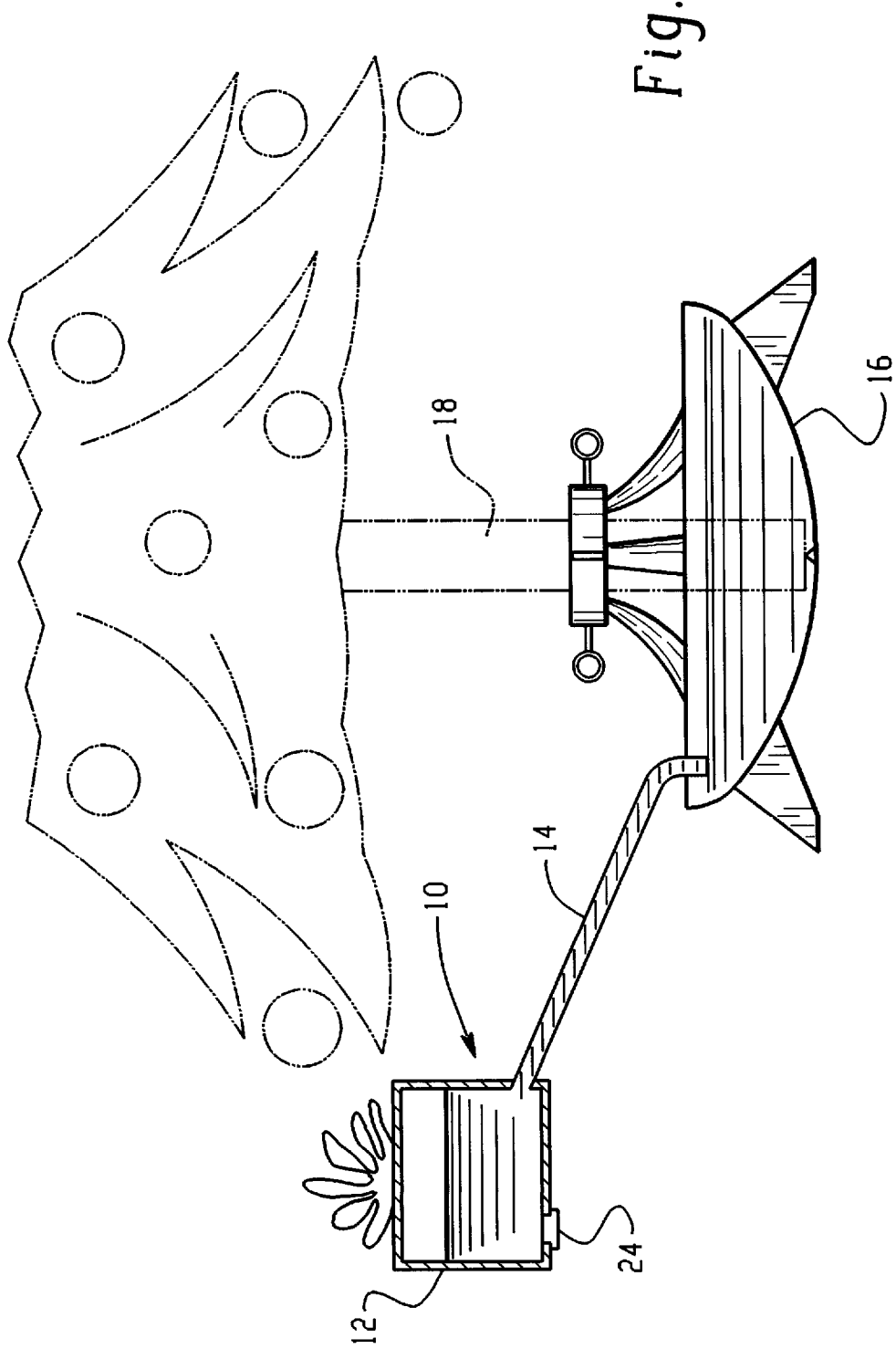

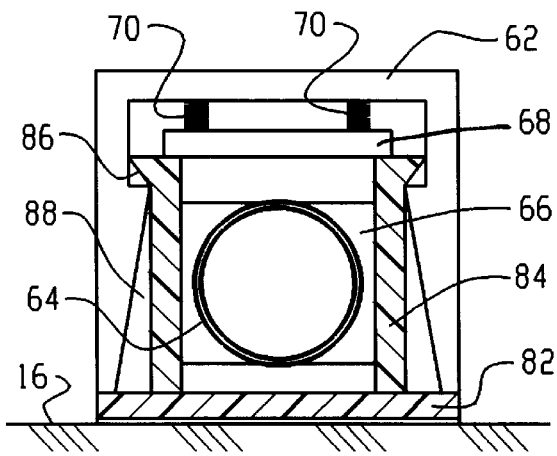
Fig. 6A
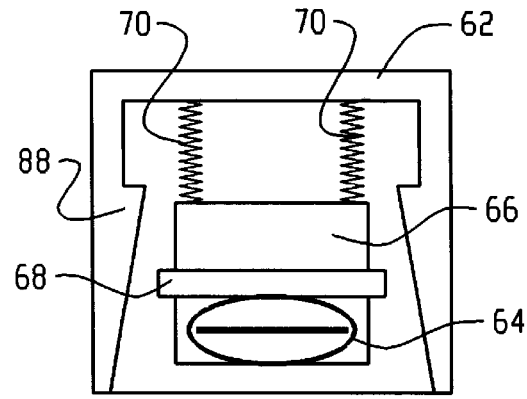
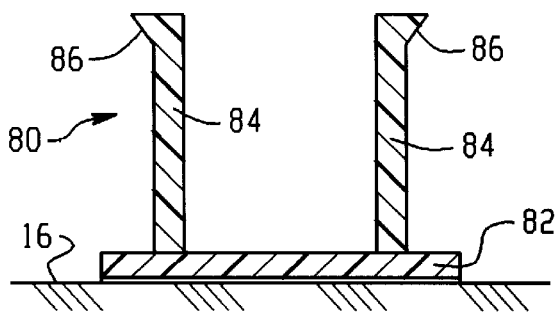
Fig. 6B
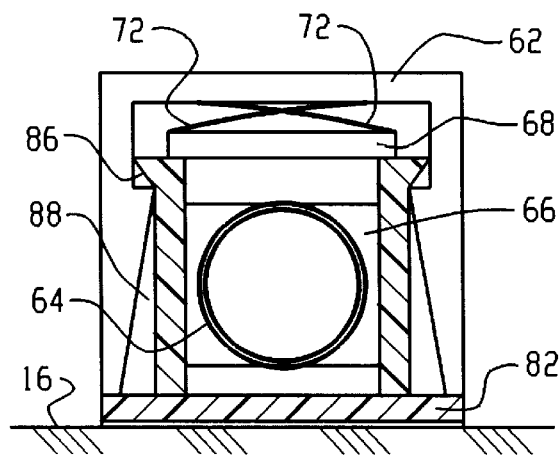
Fig. 6C
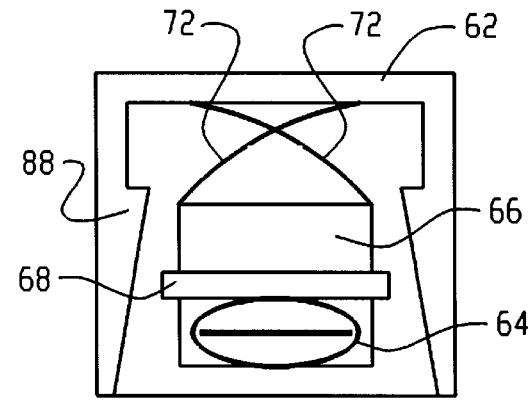
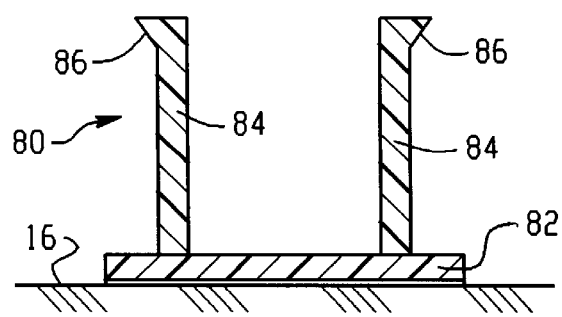
Fig. 6D

LIQUID SUPPLY DEVICE AND VALVE STRUCTURE

BACKGROUND OF THE INVENTION

The present invention pertains to the field of devices which dispense a liquid, for example, those that supply a liquid such as water to a basin. The invention has particular applicability to the field of devices which provide a supply of water to a plant, e.g. a Christmas tree. However, it should be understood that this device also has applicability to the field of devices which provide a continuous supply of liquid to other sources, e.g. devices which provide water to animals, such as pets and livestock.

A number of devices are known previously for providing a continuous supply of water to a plant, e.g. a Christmas tree. Such previous devices typically include some sort of fluid conduit for providing water to the plant. These devices typically rely on various fluid mechanical principles to provide water to the plant basin, for example, siphoning. Other devices provide various electrical and mechanical structures for regulating the flow of water through the conduit to the plant basin. However, in such previous systems, it is common that the fluid conduit can become dislodged from the basin, in which case water can spill onto the floor, creating a mess and a potential hazard. This problem can also occur during installation and refilling of the liquid supply, resulting in difficulties in operation.

The previous devices also suffer from many other drawbacks. Most previous devices don't have a sufficient water storage capacity to provide a fluid source which can last for a period of weeks. Also, many other devices include a built-in tree stand, requiring the consumer to purchase redundant hardware. Many previous devices are unaesthetic in appearance and are highly complex mechanically, thus expensive to manufacture.

SUMMARY OF THE INVENTION

In view of the drawbacks associated with previous supply devices, it would be advantageous to provide a supply device which precludes the spilling of water and the potential hazard associated therewith.

Therefore, there is a need for a supply device which includes a removable support structure for securing a supply tube to a basin.

There is also a need for a supply device which includes a valve structure for automatically discontinuing flow from the supply tube.

There is also a need for a supply device which can provide a large liquid storage capacity.

There is also a need for a supply device which can be used with an existing liquid basin.

There is also a need for a supply device which can provides an unobtrusive aesthetic appearance.

There is also a need for a supply device which is simple in construction and includes few moving parts.

There is also a need for a supply device which is inexpensive to manufacture.

These needs and others are satisfied by the present liquid supply device. A reservoir is provided for retaining a liquid and providing a liquid flow therefrom. A supply tube is provided for connecting the liquid flow from the reservoir to the basin. A support structure retains the supply tube to the basin. A shut-off valve is attached to the supply tube and engages the support structure so as to automatically discontinue the liquid flow in the event that the supply tube becomes disengaged from the support structure.

A number of embodiments are shown for realizing the present invention. As will be appreciated, the invention is capable of other and different embodiments, and its several details are capable of modifications in various respect, all without departing from the invention. Accordingly, the drawings and descriptions are to be regarded as illustrative in nature and not restrictive.

BRIEF DESCRIPTION OF THE DRAWINGS

The embodiments of the invention will now be described by way of example only, with reference to the accompanying figures wherein the members bear like reference numerals and wherein:

FIG. 1 is a side sectional view showing the general configuration of a preferred embodiment of the invention.

FIGS. 6A and 6B, 6C and 6D are front sectional views showing the structure and operation of the pinch valve embodiment as according to the present invention.

DETAILED DESCRIPTION OF THE INVENTION

Figure 2A:
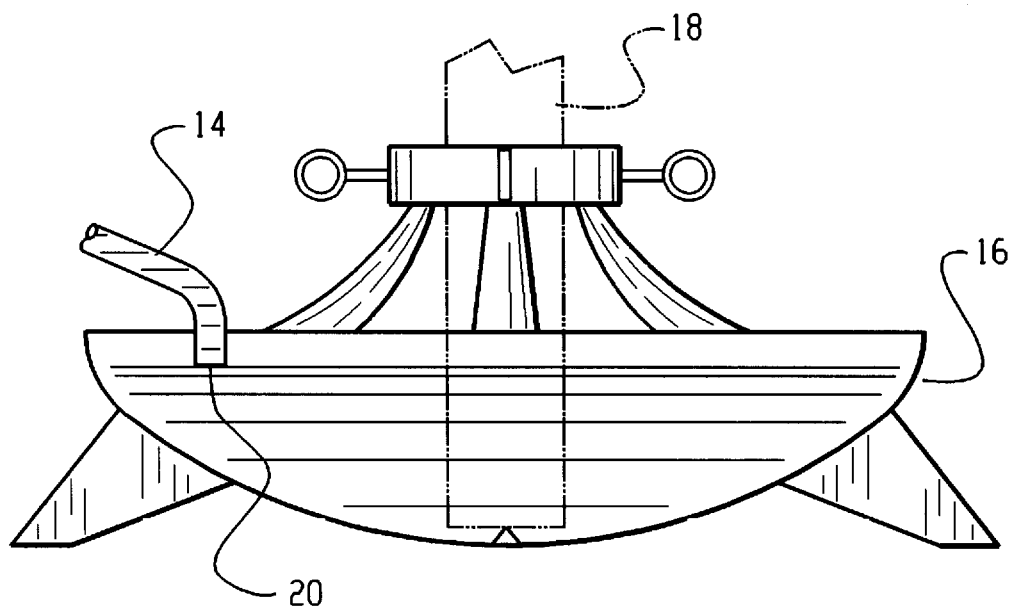
FIGS. 2A and 2B are side sectional views depicting the operation of a preferred embodiment of the invention.

Referring now to the drawings which are for purposes of illustrating only the preferred embodiments of the present invention and not for purposes of limiting the same, the figures show a liquid supply device and valve structure for supplying a liquid, e.g. water, to a basin. Turning specifically to FIG. 1, the present supply device 10 includes a reservoir 12 for retaining a supply of liquid, e.g. water. A supply tube 14 is provided for supplying water to a basin 16, which can be a common stand of the type used for supporting and watering a Christmas tree 18.

Figure 2B:
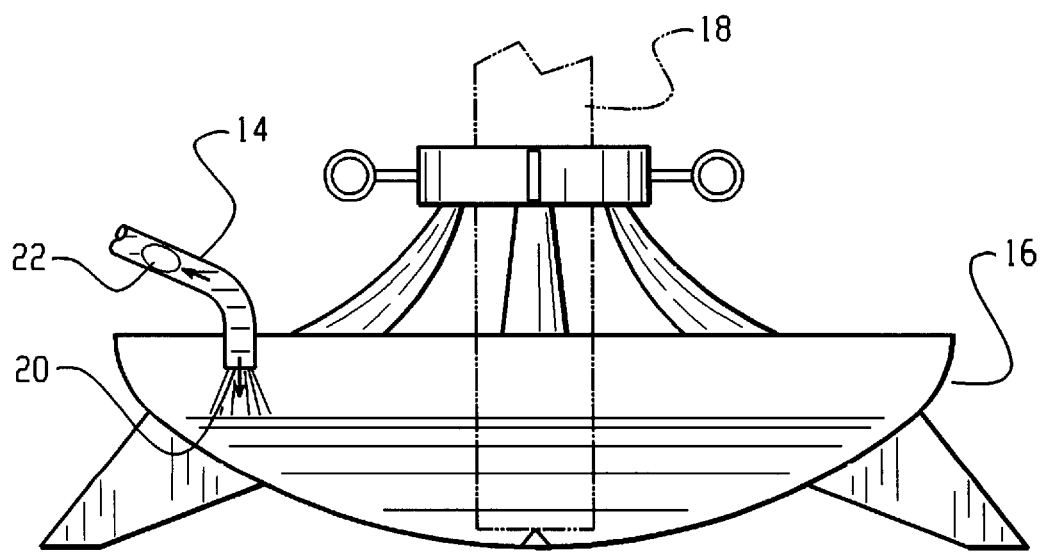

In the preferred embodiment, the present supply device 10 is a gravity-fed, hydrostatically-balanced system. The reservoir 12 is airtight and can be made to hold any quantity of fluid required. The opening of the reservoir 12 into the supply tube 14 is maintained at a level higher than the rim of the basin 16. The supply tube 14 has an opening 20 which is flush with the desired level of water in the basin 16. When the opening 20 is in contact with the water level in the basin 16 an airtight seal is maintained which prohibits air from entering the opening 20. In this condition, the air in the airtight reservoir 12 exerts a negative pressure against the water in the reservoir 12 which maintains the water in the basin 16 at a constant level in accordance with the principles of hydrostatic equilibrium. In operation, as is also with the water shown in FIGS. 2A and 2B, the water level drops as the tree draws up water. Eventually, the level drops to the point where water contact with the opening 20 is broken. Air enters the tube 14 and air bubbles 22 travel upward into the reservoir 12, displacing an equal volume of water which flows into the basin 16, restoring the desired water level to hydrostatic equilibrium.

The reservoir 12 of the present invention is preferably filled through a hole in the bottom of the reservoir 12, which is sealed with a threaded plug 24 having a fluid-tight seal. The reservoir can optionally be made to look like a wrapped Christmas present, so as to provide an unobtrusive appearance under a Christmas tree. Of course, it will be appreciated that the present invention can also operate under any other hydrostatic, hydrodynamic or other mechanical principles which could be contemplated, without departing from the invention.

In order to avoid any undesired spillage and facilitate refilling or removal of the device, a shut-off valve is incorporated including a support structure for retaining the supply tube 14 to the basin 16. The valve automatically discontinues the water flow in the event of disengagement of the supply tube 14 from the support structure. Various valve configurations are shown in FIGS. 3–6.

Figure 3A:
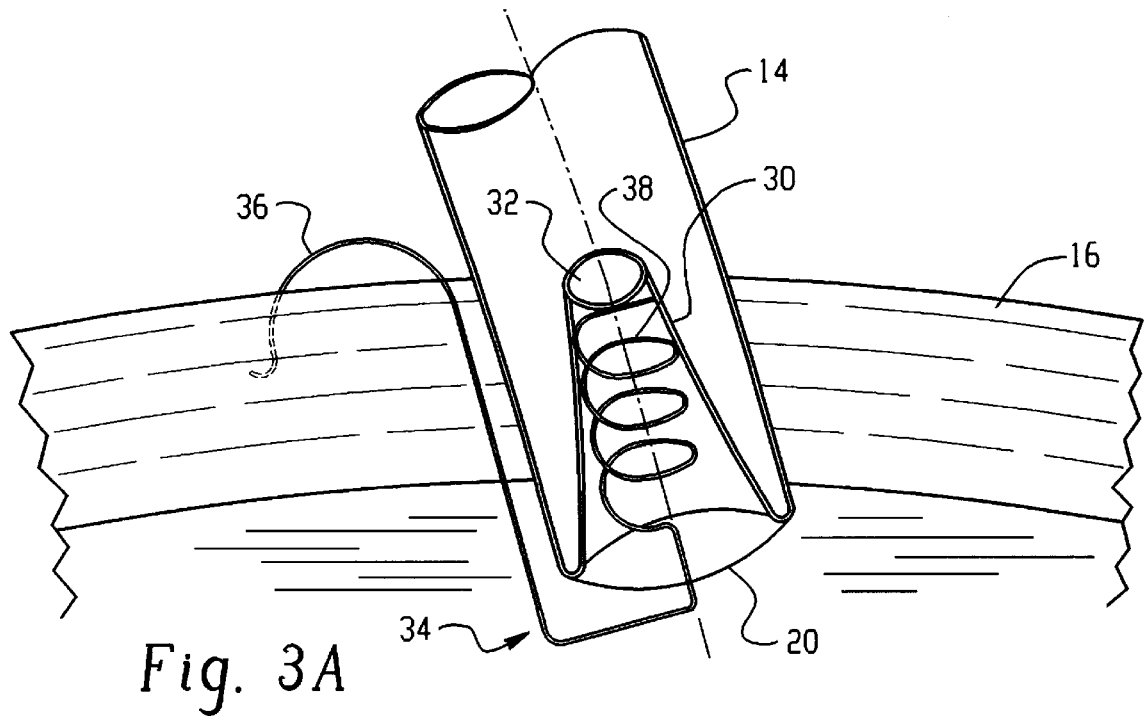
FIGS. 3A and 3B are oblique sectional views showing the structure and operation of the duckbill valve embodiment as according to the present invention.
Figure 3B:
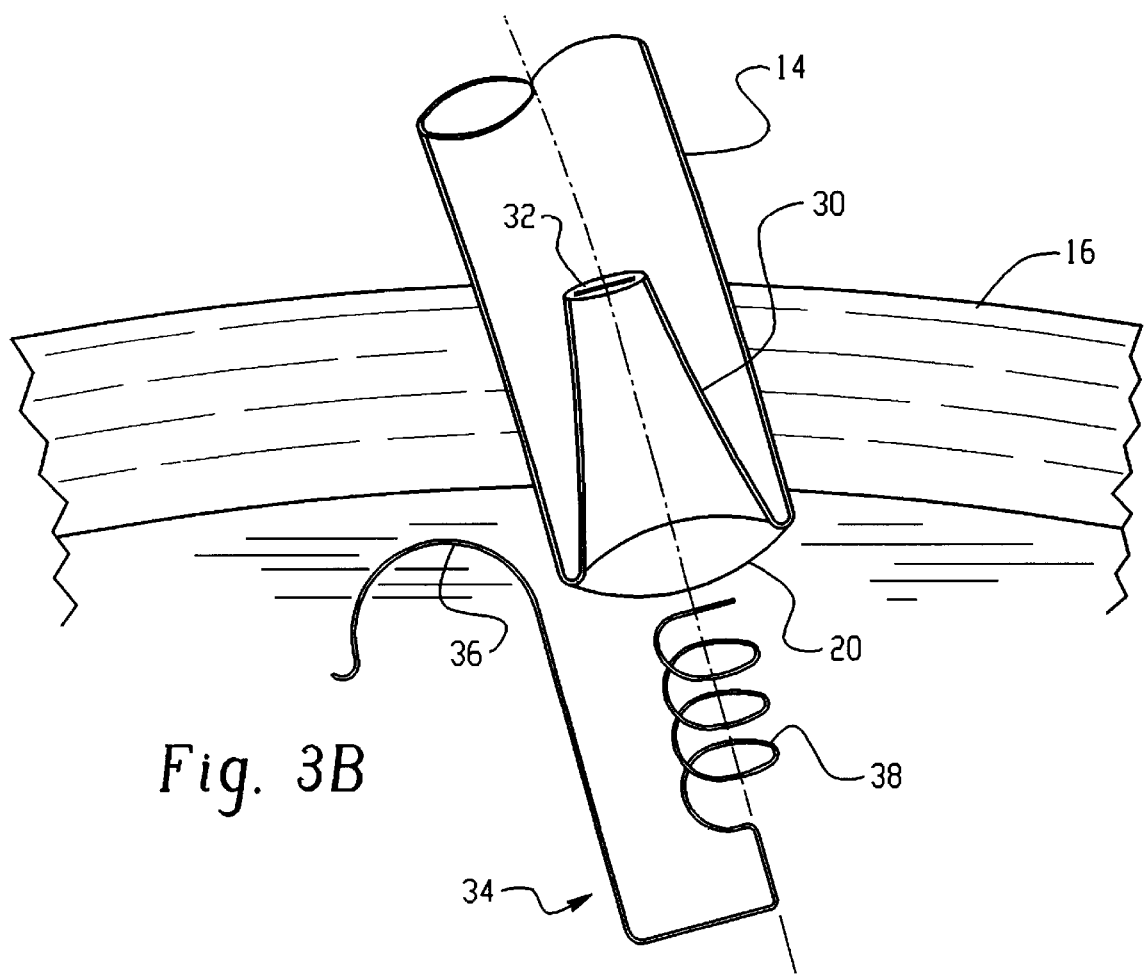

FIGS. 3A and 3B show the shut-off valve embodiment having a duckbill valve configuration. In this embodiment, the supply tube 14 is formed of a flexible elastomeric material preferably Tygothane™ or another type of polyester urethane. A flexible duckbill valve portion 30 is formed integrally with the flexible supply tube 14, and is joined to the tube 14 at the opening 20. The duckbill portion 30 is tapered and flattened from the tube opening 20 to the valve outlet 32. The valve 30 is fashioned so as to be in the normally closed position in order to not permit water flow through the tube 14.

A support structure in the form of a securing member 34 is provided including a clip 36 which attaches the securing member 34 to the basin 16. The securing member 34 includes a retaining section, preferably in the form of a coil section 38, which fits inside the duckbill portion 30 to hold it in an open position to permit water and air flow therethrough. The clip 36 maintains a more secure attachment to the basin 16 than that of the coil section 38 to the duckbill portion 30. Thus, in the event that the tube 14 becomes dislodged from the securing member 34 the coil section 38 comes free of the duckbill portion 30, which seals to discontinue water flow. The pressure of the water within the tube 14 provides additional force against the surfaces of the duckbill 30 which closes the outlet 32 even tighter.

Figure 4A:
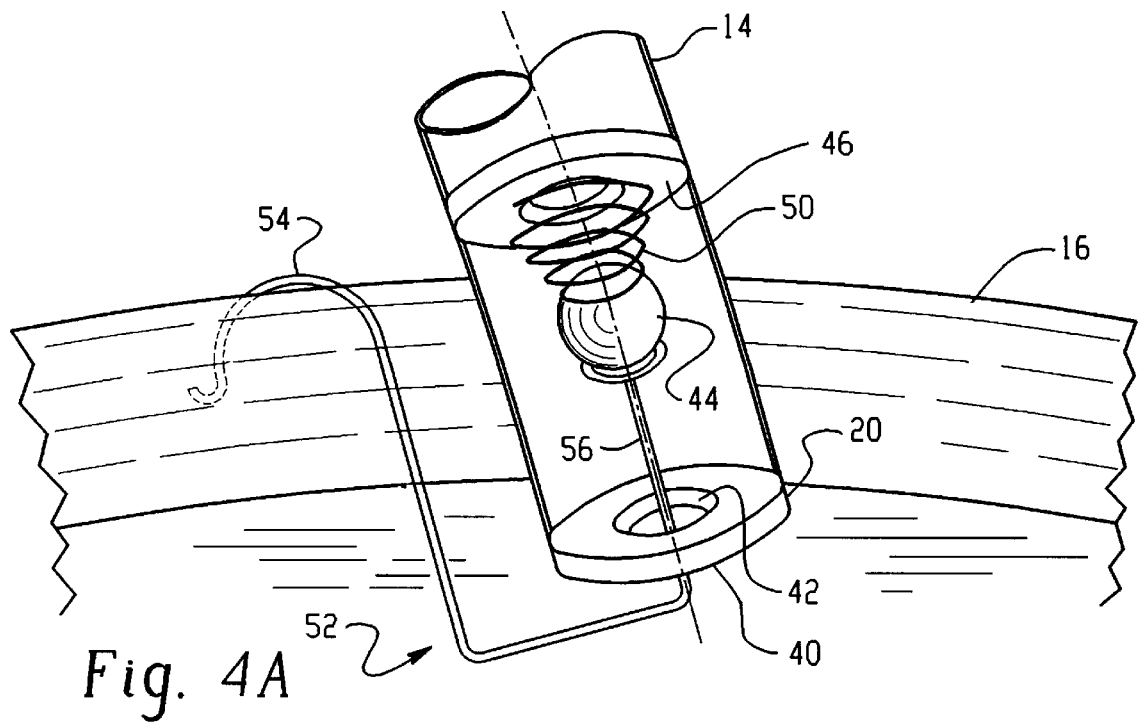
FIG. 4A and 4B are oblique sectional views showing the structure and operation of the ball valve embodiment as according to the present invention.
Figure 4B:
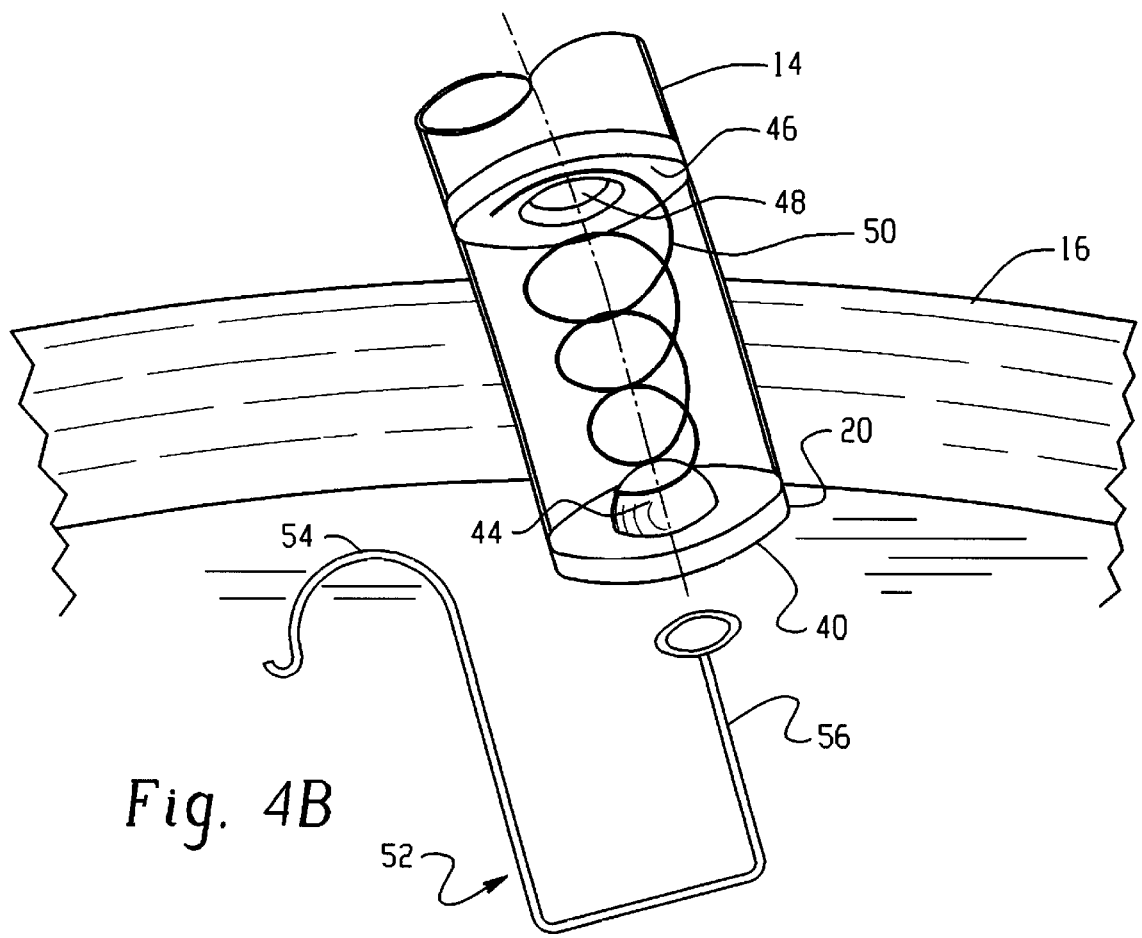
Figure 5:
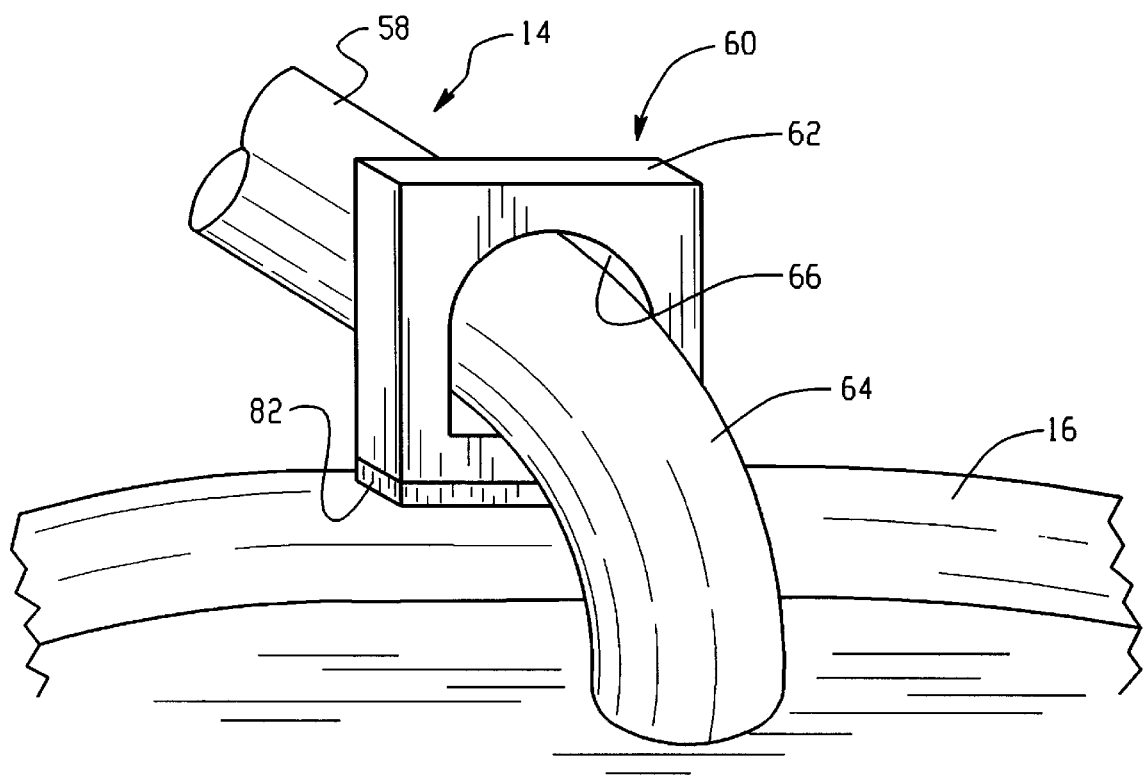
FIG. 5 is an oblique view showing the structure and configuration of the pinch valve embodiment as according to the present invention.

FIGS. 4A and 4B show the shut-off valve embodiment having a ball valve configuration. In this embodiment, the supply tube 14 is also formed of a flexible material such as Tygothane™ or the like. A lower stop portion 40 is secured to the tube 14, preferably at or near the opening 20. The lower stop 40 includes an orifice 42 for permitting water flow, said orifice preferably having tapered sides shaped so as to receive a ball valve 44 in sealing engagement. An upper stop 46 is also provided, said upper stop 46 also having an orifice 48 for permitting water flow. A spring 50, preferably a coil spring, is attached to the upper stop 46 and the ball valve 44 in order to urge the ball valve 44 toward sealing engagement with the lower stop 40. A securing member 52 is also provided with this embodiment including a clip 54 for attaching the securing member 52 to the basin 16. The retaining section of the securing member of this embodiment is in the form of a seat member 56 which extends within the supply tube 14 to displace the ball valve 44, thereby compressing the spring 50 and permitting water flow. In the event that the tube 14 becomes dislodged from the securing member 52, the spring 50 seals the ball valve 44 against the lower stop 40, thereby discontinuing water flow. In an alternative embodiment, the upper stop 46 and spring 50 can also be optionally omitted, since the force of the water flow upon dislodging would be sufficient to drive the ball valve 44 into sealing engagement with the lower stop 40.

FIGS. 5 and 6A–D show the shut-off valve embodiment having a pinch valve configuration. In this embodiment, the supply tube 14 includes a rigid tube section 58 which securely connects the reservoir 12 to a pinch valve assembly 60 including a valve housing 62. A flexible tube section 64 is connected to the rigid tube 58 internally within the valve assembly 62. The flexible tube resides in a tube passage 66 within the valve assembly 62. The valve assembly 62 includes a hollow cavity which receives the various valve components. A pinch plate 68 is retained within the cavity and is spring-biased downwardly so as to collapse and thereby seal the flexible tube 64 in order to discontinue water and air flow. The pinch plate 68 is preferably biased downwardly using a pair of coil springs 70, as shown in FIGS. 6A and 6B, or with a pair of leaf springs 72, as shown in FIGS. 6C and 6D.

The support structure of this embodiment is in the form of a valve key 80 for locking the pinch plate 68 in an open position to permit water flow. The valve key 80 includes a base 82 which is secured to the basin 16, preferably with an adhesive, and a pair of extending arms 84 which extend inside the cavity of the valve housing 62, in order to displace the pinch plate 68 to the open position.

In the preferred embodiment, a locking tab 86 is provided on each extending arm 84, and pair of key rests 88 are provided, one for each extending arm 84. In order to secure the extending arms 84 within the valve housing 62, a key rest 88 is provided. Each key rest 88 is formed with an extending portion within the valve housing cavity, having a tapered surface and a ledge surface. The locking tab 86 is formed near the top of the extending arm 84 and extends perpendicularly outward from each arm 84 within the plane of the entire valve key 80. In this way, the separation between the ends of the locking tabs 86 is greater than the most narrow separation between the tapered key rests 88. Thus, the valve housing 62 can be slid over the valve key 80 so that the locking tabs 86 engage internally with the top ledge of the respective key rests 88 and in this way displace the pinch plate 68 to hold the valve open. The locking tabs 86 are themselves tapered so as to facilitate removal of the key 80 when desired. In the event that the valve housing 62 becomes inadvertently disengaged, the pinch plate 68 presses down on the flexible tube 64 and thereby discontinues the liquid flow.

In this way, the present invention provides a device for automatically watering a plant for an extended period without risk of accidental spillage. The present invention is therefore childproof and safe from animals, and also provides a high degree of reliability. Also, the present invention is simple in design, using few moving parts, and is thus economical to manufacture. The present invention also permits the owner of a Christmas tree to keep the tree for an entire holiday season without watering, providing convenience and a longer-lasting tree thereby reducing the potential for fire hazard.

As described hereinabove, the present invention solves many problems associated with previous liquid supply devices, and presents improved usefulness and operating efficiency. However, it will be appreciated that various changes in the details, materials and arrangements of parts which have been herein described and illustrated in order to explain the nature of the invention may be made by those skilled in the art within the principle and scope of the invention as expressed in the appended claims.

I claim:

1. A supply device for providing a liquid to a basin, said supply device comprising:

a reservoir for retaining the liquid and providing a liquid flow therefrom, wherein said reservoir is at a position remote from the basin;

a supply tube for connecting the liquid flow from the reservoir to the basin;

a support structure for retaining said supply tube to said basin; and a shut-off valve attached to the supply tube and in mechanical engagement with the support structure;

biasing means for biasing the valve into a normally closed sealing engagement position;

a retaining section for holding the valve in an open position to permit liquid and air flow therethrough, wherein the biasing means automatically discontinues liquid flow-through the valve in the event that the supply tube is disengaged from the support structure.

2. The supply device of claim 1 wherein the supply device is a hydrostatic system in which the reservoir is airtight and the supply tube has an opening set below the level of the reservoir, so as to maintain the liquid level in the basin at the level of the opening.

3. The supply device of claim 1 wherein the supply tube comprises a flexible section and the shut-off valve comprises: a pinch plate, biased by the biasing means for sealing the flexible section in order to discontinue the liquid flow to the basin; and wherein the retaining section comprises a valve key, secured to said basin, for locking said pinch plate into an open position for permitting liquid flow, wherein upon disengagement of the valve key, the pinch plate seals the flexible section.

4. The supply device of claim 1 wherein the sealing means includes a pinch plate and wherein the shut-off valve further comprises a valve housing for retaining said pinch plate and receiving said valve key, wherein the valve housing includes a key rest for securing the valve key.

5. The supply device of claim 4 wherein the valve key comprises a base, secured to the basin and a pair of extending arms, each having a locking tab, wherein the key rest comprises a pair of extending portions, each having a tapered surface and a ledge surface for cooperating with the locking tab, so as to retain the valve key in engagement with the key rest.

6. The supply device of claim 5 wherein the locking tabs include a tapered portion.

7. The supply device of claim 1 wherein the sealing means is spring-biased with a spring.

8. The supply device of claim 7 wherein the spring is a coil spring.

9. The supply device of claim 7 wherein the spring is a leaf spring.

10. The supply device of claim 1 wherein the support structure comprises a securing member including a clip which secures to the basin and includes the retaining section for retaining the shut-off valve in an open position, wherein the shut-off valve closes in the event the retaining section becomes dislodged.

11. The supply device of claim 10 wherein the supply tube is formed of a flexible material and the shut-off valve is a duckbill valve made to be integral within the supply tube, wherein the retaining section resides within the tube and retains the duckbill valve in an open position and wherein, in the event that the retaining section becomes dislodged, the duckbill valve is closed.

12. The supply device of claim 11 wherein the retaining section comprises a coil section.

13. The supply device of claim 10 wherein the shut-off valve comprises:

a lower stop, fitted at the supply tube's opening, said lower stop having an orifice;

a ball valve which is removably placed in sealing engagement with the lower stop so as to stop the liquid flow;

wherein the retaining section includes a seat member which extends within the supply tube to displace the ball valve so as to open the valve and permit liquid flow, and wherein in the event that the retaining section becomes dislodged, the ball valve is closed.

14. The supply device of claim 13 wherein the shut-off valve further comprises:

an upper stop, secured within the supply tube upstream of the supply tube's opening, said upper stop having an orifice;

and wherein the biasing means comprises a coil spring, secured to the upper stop, wherein the ball valve is attached to the coil spring and wherein the coil spring biases the ball valve toward sealing engagement with the lower stop, and wherein the seat member compresses the spring to open the valve and permit liquid flow.

15. A supply device for providing a liquid to a basin, said supply device comprising:

a reservoir for retaining the liquid and providing a liquid flow therefrom;

a supply tube for connecting the liquid flow from the reservoir to the basin;

a support structure for retaining said supply tube to said basin; and a shut-off valve attached to the supply tube and in mechanical engagement with the support structure for automatically discontinuing liquid in the event that the supply tube is disengaged from the support structure, wherein the shut-off valve comprises: sealing means for sealing the supply tube in order to discontinue the liquid flow to the basin; and wherein the support structure comprises a valve key, secured to said basin, for locking said sealing means into an open position for permitting liquid flow, wherein upon disengagement of the valve key, the sealing means seals the supply tube.

* * * * *